(12) United States Patent
Kolar

(10) Patent No.: US 6,580,621 B2
(45) Date of Patent: Jun. 17, 2003

(54) THREE-PHASE HYBRID AC-VOLTAGE/AC-VOLTAGE DIRECT CONVERTER HAVING MINIMAL COMPLEXITY AND HIGH COMMUTATION SECURITY

(75) Inventor: Johann Walter Kolar, Zürich (CH)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/229,289

(22) Filed: Aug. 28, 2002

(65) Prior Publication Data

US 2003/0043598 A1 Mar. 6, 2003

(30) Foreign Application Priority Data

Aug. 31, 2001 (AT) .............................. 1383/01

(51) Int. Cl.[7] .................... H02M 5/458; H02M 7/219
(52) U.S. Cl. ................................ 363/37; 363/127
(58) Field of Search ............... 363/17, 34, 37, 363/125, 126, 127

(56) References Cited

U.S. PATENT DOCUMENTS 4,675,802 A    6/1987 Sugimoto 5,930,134 A  *  7/1999 Glennon ............... 363/127
6,061,256 A  *  5/2000 Kolar .................. 363/37

FOREIGN PATENT DOCUMENTS

JP        61-177166        8/1986

OTHER PUBLICATIONS

Kim, S. et al.; "AC/AC Power Conversion Based on Matrix Converter Topology with Unidirectional Switches", *IEEE Transactions on Industry Applications*, vol. 36, No. 1, pp. 139–145, (Jan./Feb. 2000).

* cited by examiner

*Primary Examiner*—Jessica Han
(74) *Attorney, Agent, or Firm*—Leydig, Voit & Mayer, Ltd.

(57) ABSTRACT

The three-phase hybrid ac-voltage/ac-voltage direct converter includes two symmetrical interruptible electronics witches. Each switch includes only one power transistor and a one-phase diode bridge. As a result, only 12 power transistors are required to realize the overall system. During the changeover of a positive input terminal from one system phase to system, an output section is temporarily switched to a free-wheeling state.

4 Claims, 2 Drawing Sheets

THREE-PHASE HYBRID AC-VOLTAGE/AC-VOLTAGE DIRECT CONVERTER HAVING MINIMAL COMPLEXITY AND HIGH COMMUTATION SECURITY

BACKGROUND OF THE INVENTION

1) Field of the Invention

This invention relates to a three-phase hybrid AC-voltage/AC-voltage converter ("hybrid direct converter") for the generation of an inductive load-storing, pulse-width modulated three-phase voltage of freely selectable amplitude and frequency of the fundamental frequency, whose implementation requires a minimum number of interruptible power semiconductors, as described in the introductory clause of a first aspect.

2) Description of the Related Art

In accordance with the conventionally arts, for direct pulse-width controlled energy conversion, i.e. one having no intermediate circuit storage elements, between three-phase systems, or, with the advantage of having a lower number of interruptible power semiconductors, a combination of an output-side three-phase intermediate voltage circuit and an input-side pulse converter located on the three-phase intermediate circuit is used, which enables complete switching off of the individual bridge arms. Such a converter configuration, which is preferred because of its lower implementation cost over the matrix type converter, is described in the Austrian patent application "Device for a quasi-direct pulse-width controlled energy conversion between three-phase systems", application date Jul. 27, 2001 (inventors: Kolar/Ertl). For the implementation of a bridge arm of the input-side power converter, 3 interruptible power semiconductors are used, thereby the AC-voltage/AC-voltage converter has a total of 15 irreversible power semiconductors (IGBTs or MOSFETs). The control of the system that, as a result of the missing intermediate circuit, is to be considered as a direct converter is effected so that an interlinked line voltage is connected to the input of the output-side intermediate circuit voltage converter, which then, by an appropriate pulse-width modulation, is converted into the desired three-phase voltage system that supplies an inductive, i.e. current-injecting, consumer. As a result, segments of the continuous consumer-phase currents arise at the input of the intermediate voltage circuit pulse converter and are routed via the input-side pulse converter into the network. By an appropriate changeover, a sinusoidal power input can be obtained between the interlinked network-phase voltages after suppressing frequent spectral portions by an input filter. As the output-side pulse converter commutates on the DC side and the input-side pulse converter on the power network, i.e. AC side, the converter may be designated as a three-phase hybrid AC-voltage/AC-voltage converter.

The changeover of the input-side power converter must occur so that there will be no short-circuiting of two network phases, that is, it must not be done with overlapping. In this type of changeover, though, the last load-inductivity impressing input current of the intermediate voltage circuit converter is interrupted, for which reason, to limit the cut-off voltage of the power semiconductors, a surge voltage protector has to be provided at the input of the intermediate voltage circuit that carries the current in the changeover interval.

As previously mentioned, the hybrid direct converter has a lower complexity compared to a matrix type converter, but requires with its 15 power transistors 3 power transistors more than a direct voltage-side coupling of two intermediate voltage circuit converters with intermediate circuit capacitor, each requiring 6 power transformers (and anti-parallel diodes), which in principle will avoid the problem off switching surges.

SUMMARY OF THE INVENTION

It is an object of the present invention to provide a hybrid direct converter with only 12 interruptible power semiconductors (in combination with power diodes) and a process for controlling this device, which in principle avoids the occurrence of principle-caused switching surges, or which is a high commutation safety.

The basic idea of the invention, for implementation of the interruptible bridge arms of the input section of the hybrid direct converter, is to use two symmetrical interruptible electronic switches each, whose implementation only requires one power transistor each. The output-side intermediate voltage circuit converter of the hybrid direct converter is retained unchanged, as a result of which the overall configuration will only have 12 interruptible valves.

The device constructed in this way can in principle be controlled in the same way as the conventional hybrid direct converter. If, however, according to a second aspect, before switching off a bridge arm of the input-side converter and switching of another bridge arm, i.e. a change of the interlinked system voltage applied at the input of the output-side intermediate voltage circuit converter, the output-side intermediate voltage circuit converter is switched into the free-wheeling state, i.e. all power transistors of the output-side intermediate voltage circuit converter connected to the positive input voltage rail are made conductive (and all power transistors connected to the negative input voltage rail are blocked), or all power transistors of the output-side intermediate voltage circuit converter connected to the negative input voltage rail are connected through (and all power transistors connected to the negative input voltage rail are blocked), the input current of the output-side intermediate voltage circuit converter becomes zero and the conversion of the bridge arms of the input-side system part according to the invention can occur at zero-current, whereby a switching surge is safely avoided and no overvoltage protection has to be provided. After switching over the input-side system part, the free-wheeling state of the output-side intermediate voltage circuit converter is terminated and the circuit state required for generating the desired output voltage is assumed. This conversion strategy may, in its unchanged form, also be used for the well-known hybrid direct converter.

These and other objects, features and advantages of the present invention are specifically set forth in or will become apparent from the following detailed descriptions of the invention when read in conjunction with the accompanying drawings.

DETAILED DESCRIPTIONS

Embodiment(s) of the hybrid direct converter according to the present invention will be explained below with reference to the accompanying drawings.

Figure 1:
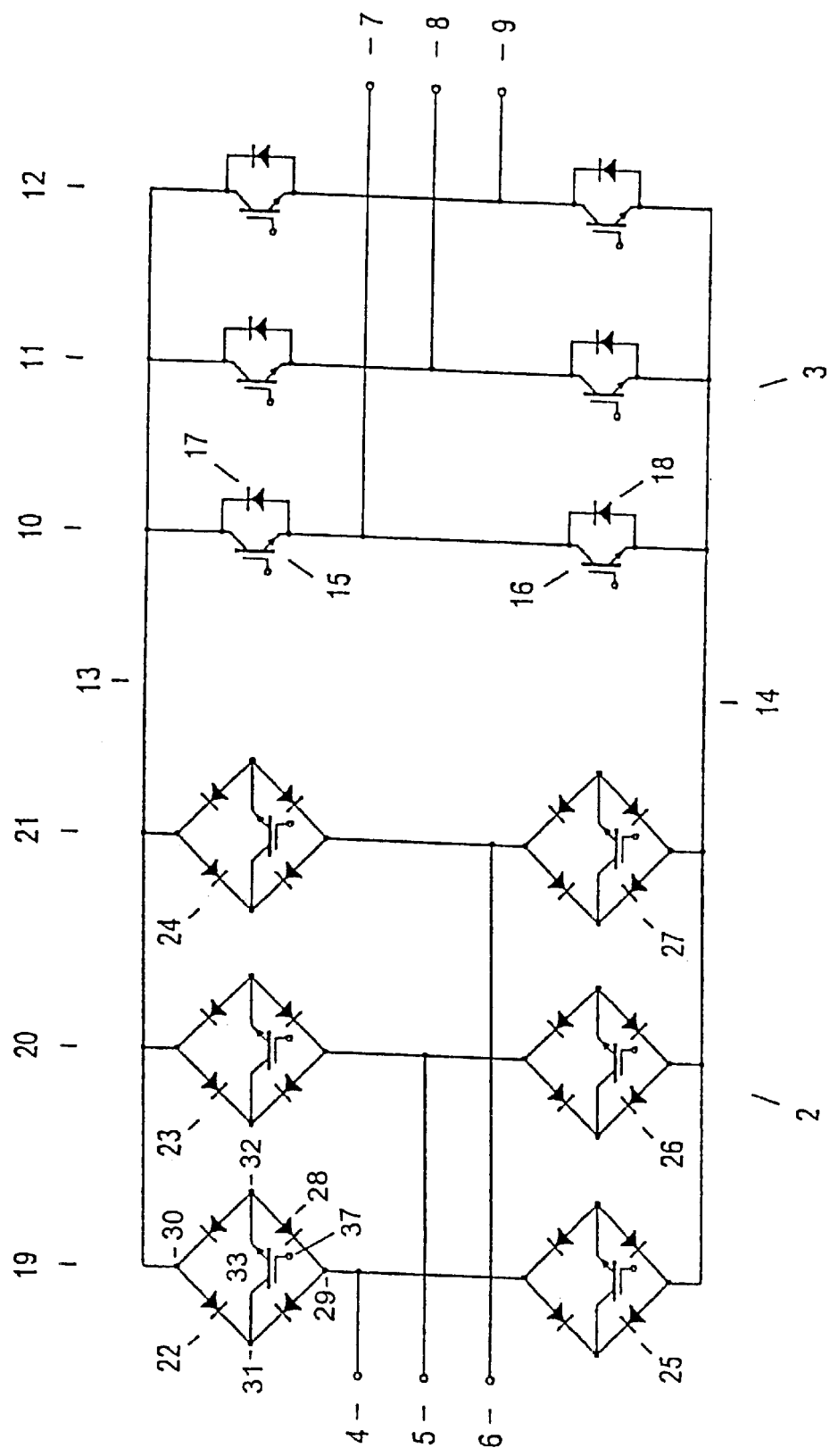
FIG. 1 is a basic configuration (simplified schematic layout) of a hybrid direct converter according to the invention of the input section of a well-known hybrid direct converter.

The hybrid direct converter 1 shown in FIG. 1 comprises the input section 2 and the output section 3. The hybrid direct converter 1 allows the conversion of the three-phase system voltage present at input terminals 4, 5, and 6 into a pulse-width modulated three-phase voltage system occurring at the output terminals 7, 8, and 9. The amplitude and frequency of the fundamentals contained in the output-phase voltage may be freely selectable.

The output section 3 is formed by a three-phase intermediate voltage circuit converter with three bridge arms 10, 11, and 12. The bridge arms 10, 11, and 12 are provided between the positive input terminal 13 and the negative input terminal 14 and they have same configuration. In each bridge arm, a collector of a power transistor 15 is connected in a well-known manner to the positive input terminal 13, emitter is connected to a collector of a power transistor 16. An emitter of power transistor 16 is connected to the negative input terminal 14. Power diode 17 is connected between the emitter and collector of the power transistor 15. Power diode 18 is connected between the emitter and collector of the power transistor 15. The power diodes 17 and 18 are placed anti-parallel to the power transistors 15 and 16 respectively. A node of the power transistors 15 and 16 of the bridge arm 10 becomes the output terminal 7. A node of the power transistors 15 and 16 of the bridge arm 11 becomes the output terminal 8. A node of the power transistors 15 and 16 of the bridge arm 12 becomes the output terminal 9.

The input section 2 also comprises three bridge arms 19, 20, and 21 provided between the positive terminal 13 and the negative terminal 14. The bridge arm 19 (or 20 and 21) is formed by two symmetrically interruptible switches 22 (or 23 and 24) and 25 (or 26 and 27). The bridge arms 19, 20, and 21 have well-known configuration that branch from the input terminals 4, 5, and 6 respectively. The symmetrically interruptible switches 22, 23, 24, 25, 26, and 27 have well-known configuration. For example the symmetrically interruptible switch 22 includes a one-phase, diode bridge 28, AC-voltage terminals 29 and 30, DC voltage terminals 31 and 32, and a power transistor 33. An emitter of the power transistor 33 is connected to the DC-voltage terminal 32, where the AC-voltage terminals 29 and 30 are forming the switching poles.

By making conductive the symmetrically interruptible electronic switches 22 and 27, the interlinked system voltage present between the input terminals 4 and 6 is applied to input terminals 13 and 14 of the output section 3 and can be converted by the pulse-width modulation of 3 into the required three-phase system at the output terminals 7, 8, and 9. The controllability of the hybrid direct converter 1 thus corresponds to that of the well-known hybrid direct converter and a more detailed description is, therefore, being omitted.

Figure 2:
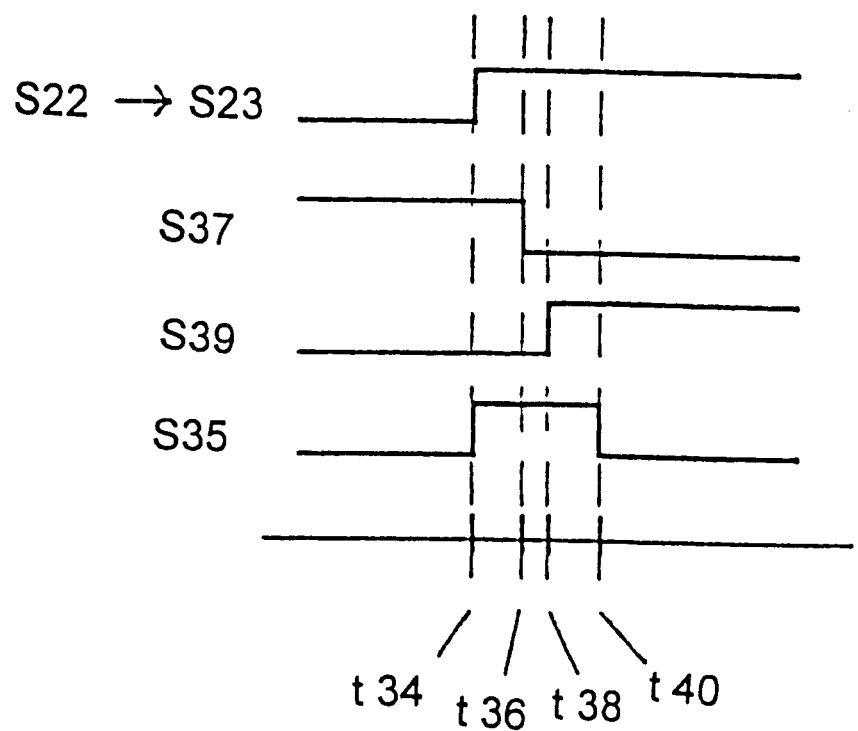
FIG. 2 is a timing diagram of the switching commands for a switchover of the input-side current converter and the free-wheeling command routed to the control of the output-side intermediate voltage circuit converter.

In order to obtain the appropriate distribution of the input current from output section 3 to the system phases 4, 5, 6 and, shown in FIG. 2 with signal S22→S23, and to switch over the positive input terminal 13 of output section 3, from the system phase 4 in time t34 to system phase 5 (where a positive input voltage of the output section 3 has to occur again), the output section 3 will be temporarily switched to the free-wheeling state (see control signal S35 in FIG. 2), i.e. the power transistors 15 of bridge arms 10, 11, and 12 will become conductive and the power transistors 16 will be blocked, or the power transistors 16 of bridge arms 10, 11, and 12 will become conductive and the power transistors 15 blocked, as a result of which the input current of the output section will become zero. The subsequent switching off of switch 22 in time t36 (see control signal S37 in FIG. 2) consequently takes place at zero current, as does the subsequent switching on of switch 23 in time t38 (see control signal S39 in FIG. 2). Subsequently, the free-wheeling state 35 of the output section will be terminated in time 40 and the control commands required for the formation of the respective output voltage 7, 8, and 9 are applied to the power transistors of the output section. The switching over between system phase 4 and 5 thus takes place without overlapping, i.e. with a delay corresponding to the difference between time t38 and time t36, short-circuiting of the system phases will be safely prevented, even at finite switchover speeds and signal operating times of the control steps of switches 22 and 23. The time interval of the switchover points 36 and 34 and 40 and 38 will also be selected with respect to the signal periods in signal processing and the control steps of the power transistors, in order to ensure the described commutation sequences. Should there be a switchover between two system phases connected to the negative terminal 14 of the output section 3, an analogous procedure will be selected.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A three-phase hybrid ac-voltage/ac-voltage direct converter comprising:

an output section with three output bridge arms, and three output terminals corresponding to the three output bridge arms;

an input section with three input bridge arms, and three input terminals corresponding to the three input bridge arms;

a positive input terminal and a negative input terminal between the input section and the output section, wherein each input bridge arm of the input section includes a first symmetrically interruptible electronic switch branched through the input terminal and connected to the positive input terminal, and a second symmetrically interruptible switch branching from the same input terminal and connected to the negative input terminal, each of the first symmetrically interruptible electronic switch and the second symmetrically interruptible switch including a one-phase diode bridge with positive and negative AC-voltage terminals and positive and negative DC-voltage terminals and an input power transistor having a collector coupled to the positive DC-voltage terminal and an emitter coupled to the negative DC-voltage terminal, wherein the positive and negative AC-voltage terminals form switching poles.

2. The converter according to claim 1, wherein each of the output bridge arms of the output section includes a first power transistor having a collector connected to the positive input terminal, an emitter connected to a collector of a second power transistor, an emitter of the second power transistor being connected to the negative input terminal, a first power diode connected between the emitter and the collector of the first power transistor, and a second power diode connected between the emitter and the collector of the second power transistor, wherein a node of the first power transistor and the second power transistor is the output terminal.

3. The converter according to claim 2, wherein during switching of the positive input terminal from one system phase to another system phase, the output section is temporarily switched into a free-wheeling state, the first power transistors conducting and the second power transistors not conducting, or the second power transistors conducting and the first power transistors not conducting, so that input current of the output section becomes zero and subsequent switching off of the first symmetrically interruptible electronic switch, as well as subsequent switching on of the second symmetrically interruptible electronic switch occurs at zero current and the free-wheeling state of the output section will be terminated and control commands required for creation of respective output voltages will be applied to the first and second power transistors of the output section and thereby the switching between system phases will take place with a delay, surely preventing a short circuit in the system phases, and switching between two system phases connected to the negative input terminal is selected analogously and, with each switching, one of two possible free-wheeling states of the output section will always be selected, with minimum switching losses, starting from switching condition of the output section before occurrence of a switching command, with number of required switchings for attaining the free-wheeling state and switched current taken into account.

4. The converter according to claim 2, wherein the first power semiconductor, the second power semiconductor, and the input power transistor are selected from the group consisting of insulated gate bipolar transistors and metal-oxide field effect transistors.

* * * * *